United States Patent
Lindemann et al.

(10) Patent No.: US 9,917,482 B2
(45) Date of Patent: Mar. 13, 2018

(54) HYBRID DRIVE MODULE HAVING A ROTOR SECURED TO A HUB VIA STAKING

(71) Applicant: Schaeffler Technologies AG & Co. KG, Herzogenaurach (DE)

(72) Inventors: Patrick M. Lindemann, Wooster, OH (US); Markus Steinberger, Macedonia, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 104 days.

(21) Appl. No.: 14/872,664

(22) Filed: Oct. 1, 2015

(65) Prior Publication Data
US 2016/0105060 A1    Apr. 14, 2016

Related U.S. Application Data

(60) Provisional application No. 62/061,798, filed on Oct. 9, 2014.

(51) Int. Cl.
| H02K 7/10 | (2006.01) |
| H02K 1/28 | (2006.01) |
| H02K 15/02 | (2006.01) |
| B60K 6/26 | (2007.10) |
| H02K 11/225 | (2016.01) |
| B60K 6/442 | (2007.10) |
| H02K 1/02 | (2006.01) |
| H02K 1/27 | (2006.01) |
| H02K 7/108 | (2006.01) |

(Continued)

(52) U.S. Cl.
CPC .............. *H02K 1/28* (2013.01); *B60K 6/26* (2013.01); *B60K 6/442* (2013.01); *H02K 1/02* (2013.01); *H02K 1/27* (2013.01); *H02K 7/006* (2013.01); *H02K 7/10* (2013.01); *H02K 7/108* (2013.01); *H02K 11/225* (2016.01); *H02K 15/00* (2013.01); *H02K 15/02* (2013.01); *Y10S 903/902* (2013.01)

(58) Field of Classification Search
CPC .. H02K 1/27–1/28; H02K 7/006; H02K 7/10; H02K 7/108; H02K 15/02–15/03; B60K 6/26; B60K 6/40; F16H 45/00; Y10T 29/49012
See application file for complete search history.

(56) References Cited

U.S. PATENT DOCUMENTS

| 7,743,484 B2 | 6/2010 | Fukumaru et al. |
| 7,923,889 B2 | 4/2011 | Tou |
| 2007/0170797 A1 | 7/2007 | Agematsu |

(Continued)

FOREIGN PATENT DOCUMENTS

| JP | 2004048925 A * | 2/2004 |
| KR | 10-0789188 B1 | 2/2008 |

*Primary Examiner* — Richard M Lorence

(57) ABSTRACT

A hybrid drive module including: a torque converter with a cover, an impeller and a turbine; a rotor for an electric motor; a hub non-rotatably connected to the rotor and the cover and including a circumferential surface and a plurality of protrusions extending radially outward from the circumferential surface; and an end plate disposed between the plurality of protrusions and the rotor and engaged with the end plate and the rotor. The plurality of protrusions is formed of a material forming the hub and restrains the end plate and the rotor, with respect to the hub, in an axial direction.

16 Claims, 7 Drawing Sheets

(51) Int. Cl.
*H02K 15/00* (2006.01)
*H02K 7/00* (2006.01)

(56) References Cited

U.S. PATENT DOCUMENTS

| | | | |
|---|---|---|---|
| 2008/0072586 A1 | 3/2008 | Hammond et al. | |
| 2008/0093135 A1* | 4/2008 | Nomura ............... | B60K 6/26 180/65.24 |
| 2011/0240430 A1* | 10/2011 | Iwase .................. | B60K 6/26 192/3.29 |
| 2011/0278967 A1* | 11/2011 | Utaka .................. | H02K 9/22 310/52 |
| 2012/0032544 A1* | 2/2012 | Kasuya ................ | B60K 1/00 310/90 |
| 2013/0087425 A1 | 4/2013 | Frait et al. | |
| 2014/0124318 A1 | 5/2014 | Frait et al. | |

\* cited by examiner

HYBRID DRIVE MODULE HAVING A ROTOR SECURED TO A HUB VIA STAKING

CROSS-REFERENCE TO RELATED APPLICATIONS

This application claims the benefit under 35 U.S.C. § 119(e) of U.S. Provisional Patent Application No. 62/061,798, filed Oct. 9, 2014, which application is incorporated herein by reference in its entirety.

TECHNICAL FIELD

The present disclosure relates generally to a hybrid drive module including a rotor, for an electric motor, secured to a cast aluminum hub via staking of the hub.

BACKGROUND

It is known to use a hybrid combination of an internal combustion engine and an electric motor to power a vehicle. For electric motor rotors designed such that an inner diameter of the rotor is a "clearance fit" (also known as a "sliding fit" or "slip fit") about an outer diameter of a hub, a means of axially retaining the rotor on the hub is required. Typically, one side of the hub will have a formed-in flange providing axial retention for that side of the hub. However, the other side of the hub needs a means, which does not interfere with assembling the rotor and the hub, of axially retaining the rotor after the assembly of the rotor and the hub.

It is known to secure the rotor to the hub via a formed-in flange on the hub and a nut threaded onto the hub after installation of the rotor. The threading operation and use of a nut increases the cost, complexity, and parts count of the resulting assembly. It also is known to secure the rotor to the hub via a formed-in flange on the hub and, after installing the rotor on the hub, bending a portion of the hub to form one or more tab to axially retain the rotor. The tabs do not provide adequate axial retention for rotors having larger masses. It also is known to fix a resolver rotor to the hub using the above methods.

BRIEF SUMMARY

According to aspects illustrated herein, there is provided a hybrid drive module including: a torque converter with a cover, an impeller and a turbine; a rotor for an electric motor; a hub non-rotatably connected to the rotor and the cover and including a circumferential surface and a plurality of protrusions extending radially outward from the circumferential surface; and an end plate disposed between the plurality of protrusions and the rotor and engaged with the end plate and the rotor. The plurality of protrusions is formed of a material forming the hub and restrains the end plate and the rotor, with respect to the hub, in an axial direction.

According to aspects illustrated herein, there is provided a hybrid drive module, including a torque converter including a cover, an impeller and a turbine; a rotor for an electric motor; an end plate; a spring located between the end plate and the rotor and urging the rotor in a first axial direction; and a hub non-rotatably connected to the rotor and the cover and including a circumferential surface and a plurality of protrusions. The plurality of protrusions extends radially outward from the circumferential surface, is formed of the material forming the hub, is engaged with the end plate, and restrains the rotor, with respect to the hub, in a second axial direction, opposite the first axial direction.

According to aspects illustrated herein, there is provided a method of securing components to a hub of a hybrid drive module including a torque converter and a disconnect clutch, including: non-rotatably connecting a rotor for an electric motor to a circumferential surface of a hub; placing an end plate on the first circumferential surface; deforming, using a punch, material forming the hub to form a plurality of protrusions extending radially outward from the circumferential surface; contacting the end plate with the plurality of protrusions; and restraining, with the plurality of protrusions, displacement of the end plate and the rotor, with respect to the hub, non-rotatably connecting the hub and a cover for the torque converter; non-rotatably connecting the hub and a cover for the torque converter; in an axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
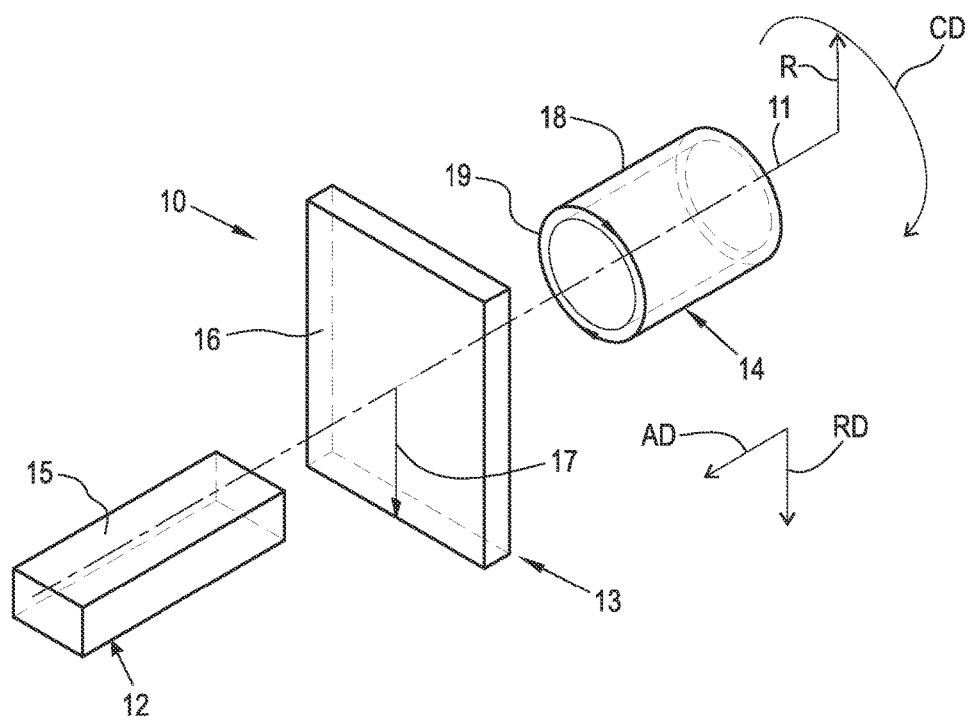
FIG. 1 is a perspective view of a cylindrical coordinate system demonstrating spatial terminology used in the present application.

FIG. 1 is a perspective view of cylindrical coordinate system 10 demonstrating spatial terminology used in describing the present disclosure. The present disclosure is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11.

The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD. The adverbs "axially," "radially," and "circumferentially" also are regarding orientation parallel to respective planes.

Figure 2:
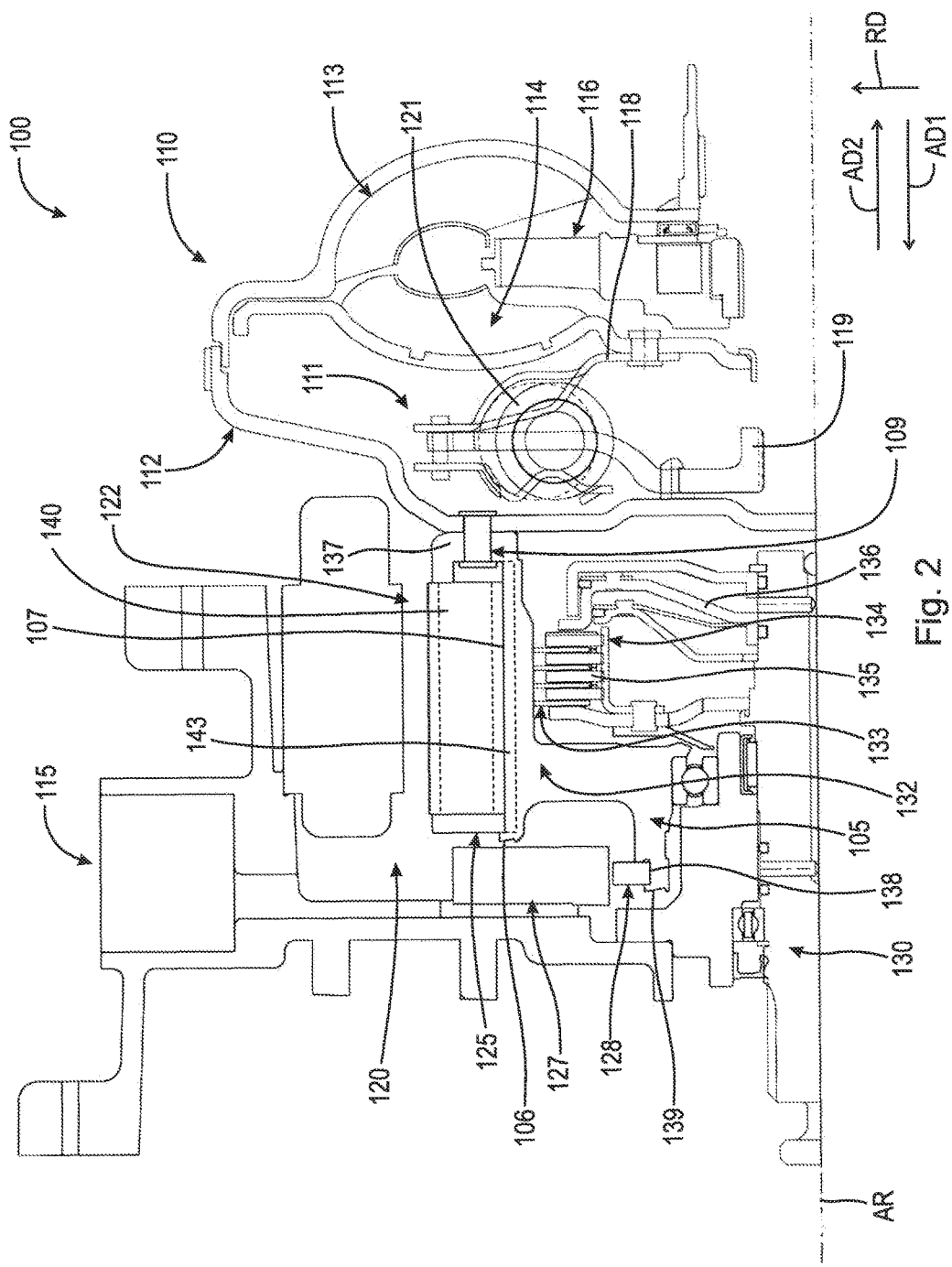
FIG. 2 is a cross-sectional view of a hybrid drive module, showing a rotor of an electric motor secured by an end plate and staking.

FIG. 2 is a cross-sectional view of hybrid drive module 100, showing a rotor of an electric motor secured by an end plate and staking Hybrid drive module 100 (hereinafter referred to as module 100) includes: axis of rotation AR; torque converter 110; hub 105; end plate 125; and electric motor 120 including rotor 122. Torque converter 110 includes cover 112, impeller 113, turbine 114, and stator 116. Hub 105 is non-rotatably connected to cover 112, for example, by at least one rivet 109. Hub 105 includes circumferential surface 107 and protrusions 106. Rotor 122 is engaged with surface 107 and is non-rotatably connected to hub 105, for example, by splines 143. Plate 125 is engaged with rotor 122. Protrusions 106 extend radially outward in direction RD from circumferential surface 107, are formed of the material forming hub 105, are in contact with plate 125, and restrain plate 125 and rotor 122 in direction AD1.

In an example embodiment, protrusions 106 restrain plate 125 and rotor 122 with respect to movement in axial direction AD2, opposite direction AD1. That is, protrusions 106 fix an axial position of rotor 122 on hub 105. For example, protrusions 106 are in contact with plate 125, which forces rotor 122 into contact with shoulder 137 of hub 105. Thus, rotor 122 is unable to displace in either direction AD1 or AD2.

Figure 3:
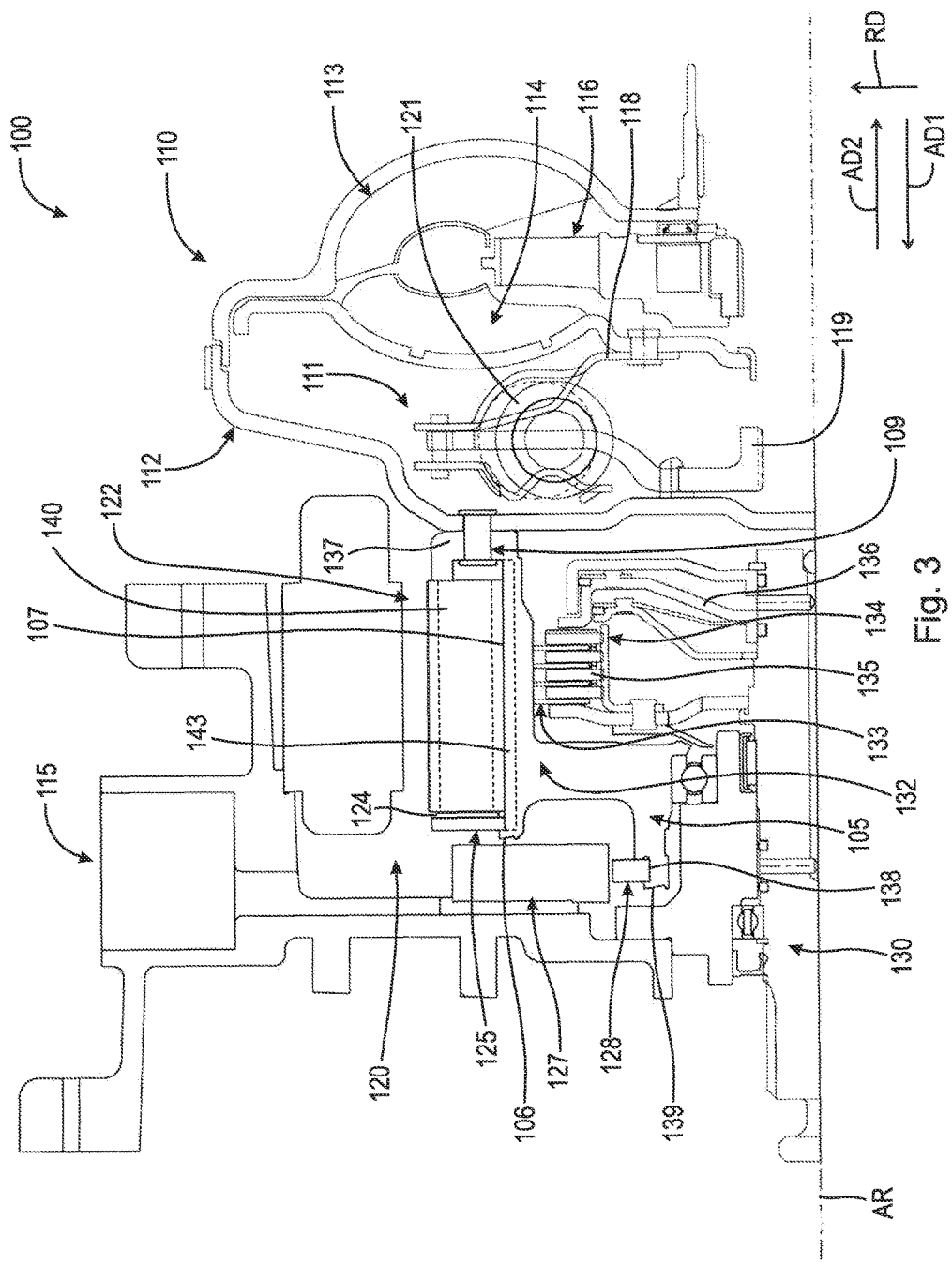
FIG. 3 is a cross-sectional view of a hybrid drive module, showing a rotor of an electric motor secured by an end plate, a spring and staking.

FIG. 3 is a cross-sectional view of a hybrid drive module, showing a rotor of an electric motor secured by an end plate, a spring, and staking In an example embodiment, module 100 includes end plate 125 and spring 124, for example, diaphragm spring 124. End plate 125 is disposed between protrusions 106 and rotor 122 and is engaged with protrusions 106. Spring 124 is disposed between endplate 125 and rotor 122 and is engaged with endplate 125 and rotor 122. Spring 124 is disposed between protrusions 106 for hub 105 and rotor 122. Spring 124 reacts against end plate 125 to urge rotor 122 in direction AD2 into contact with shoulder 137, thus, providing a dynamic force axially fixing rotor 122 against shoulder 137 and better maintaining a specified axial location of the rotor with respect to the hub. In an example embodiment, protrusions 106 are in contact with plate 125. In an example embodiment, spring 124 is in contact with end plate 125.

Unless noted otherwise, the following is applicable to both FIGS. 2 and 3. In an example embodiment, rotor 122 includes at least one magnet 140, end plate 125 is made of a non-magnetic material to prevent electrical and magnetic shorting, and end plate 125 retains or restrains magnet 140 in direction AD1. That is, end plate 125 blocks movement of magnet 140 in direction AD1.

In an example embodiment, hub 105 includes circumferential surface 138 and protrusions 139 and module 100 includes resolver rotor 128 engaged with surface 138. Protrusions 139 extend radially outward in direction RD from circumferential surface 138, are formed of the material forming hub 105, and fix rotor 128 to hub 105. Resolver 127, fixed to housing 115, detects the rotational position of resolver rotor 128 on hub 105 in order to control the rotation and power output of electric motor 120.

In an example embodiment, module 100 includes or, is arranged to engage, input part 130 and includes disconnect clutch 132. Part 130 is arranged to receive torque, for example, from an internal combustion engine (not shown). Clutch 132 includes at least one clutch plate 133 non-rotatably connected to hub 105, inner carrier 134 non-rotatably connected to input part 130, clutch plate 135 non-rotatably connected to inner carrier 134, and piston plate 136 axially displaceable to open and close clutch 132. Clutch 132 enables selective connection of input part 130 and cover 112. Thus, module 100 can function in at least three modes. For a first mode, clutch 132 is open and electric motor 120, via rotor 122, is the only source of torque for torque converter 110. For a second mode, clutch 132 is closed, electric motor 120 is not driving torque converter 110, and the only source of torque for torque converter 110 is input part 130 via the disconnect clutch. For a third mode, clutch 132 is closed and motor 120 is used to provide torque to input part 130 to start an internal combustion engine (not shown) attached to input part 130.

In an example embodiment, torque converter 110 includes torsional vibration damper 111 with input part 118 non-rotatably connected to turbine 114, output part 119 arranged to connect to a transmission input shaft (not shown), and at least one spring 121 engaged with input part 118 and output part 119.

In an example embodiment, hub 105 is made of cast aluminum. Protrusions 106 and 139 are not cast with the hub and are not formed by any type of bending operation. Instead, as described below, protrusions 106 and 139 are fabricated by staking the cast hub. By "staking" we mean deforming respective portions of the cast hub with one or more punches. The deformed portions form protrusions 106 and 139 and secure the rotor and resolver rotor to the hub without fasteners or other added materials. Specifically, the material deformed and displaced by the staking forms protrusions 106 and 139 and creates respective interference fits between protrusions 106 and plate 125 and between protrusions 139 and rotor 127.

The difference between protrusions formed in a casting process and staked protrusions is exemplified by the physical characteristics of the material, for example aluminum, forming the cast hub (and not staked or deformed by staking) and the material forming the deformed protrusions. For example, the material forming the cast hub and not staked or deformed by the staking (for example not including material adjoining protrusions 106 or 139) has 'x' number of lattice defects, including point defects or imperfections, line defects, or surface defects-grain boundaries, per unit of volume. The material forming protrusions 106 has 'y', greater than 'x', number lattice defects, including point defects or imperfections, line defects, or surface defects-grain boundaries, per unit of volume. The material forming protrusions 139 has 'z', greater than 'x', number lattice defects, including point defects or imperfections, line defects, or surface defects-grain boundaries, per unit of volume. The increase in lattice defects results from the deformation, by the staking process, of the material forming the original cast hub.

In an example embodiment, hub 105 is made of aluminum, which advantageously reduces the weight and rotational inertia of the hub, and cover 112 is made of steel, reducing the cost of manufacturing cover 112 and increasing the durability of cover 112.

Figure 4A:
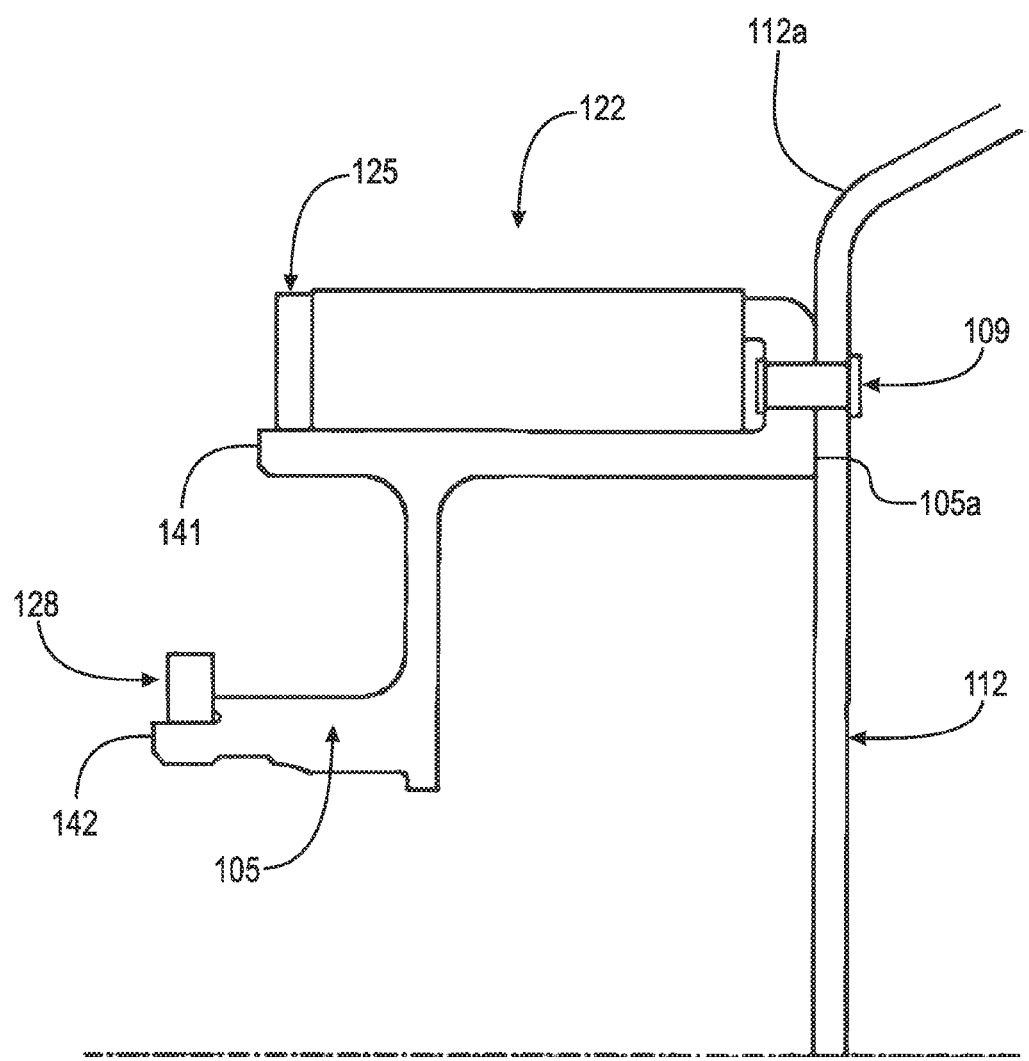
FIGS. 4A and 4B illustrate a method of securing components to a hub of a hybrid drive module including a torque converter and a disconnect clutch; and, FIGS. 5A and 5B illustrate method of securing components to a hub of a hybrid drive module including a torque converter and a disconnect clutch.
Figure 4B:
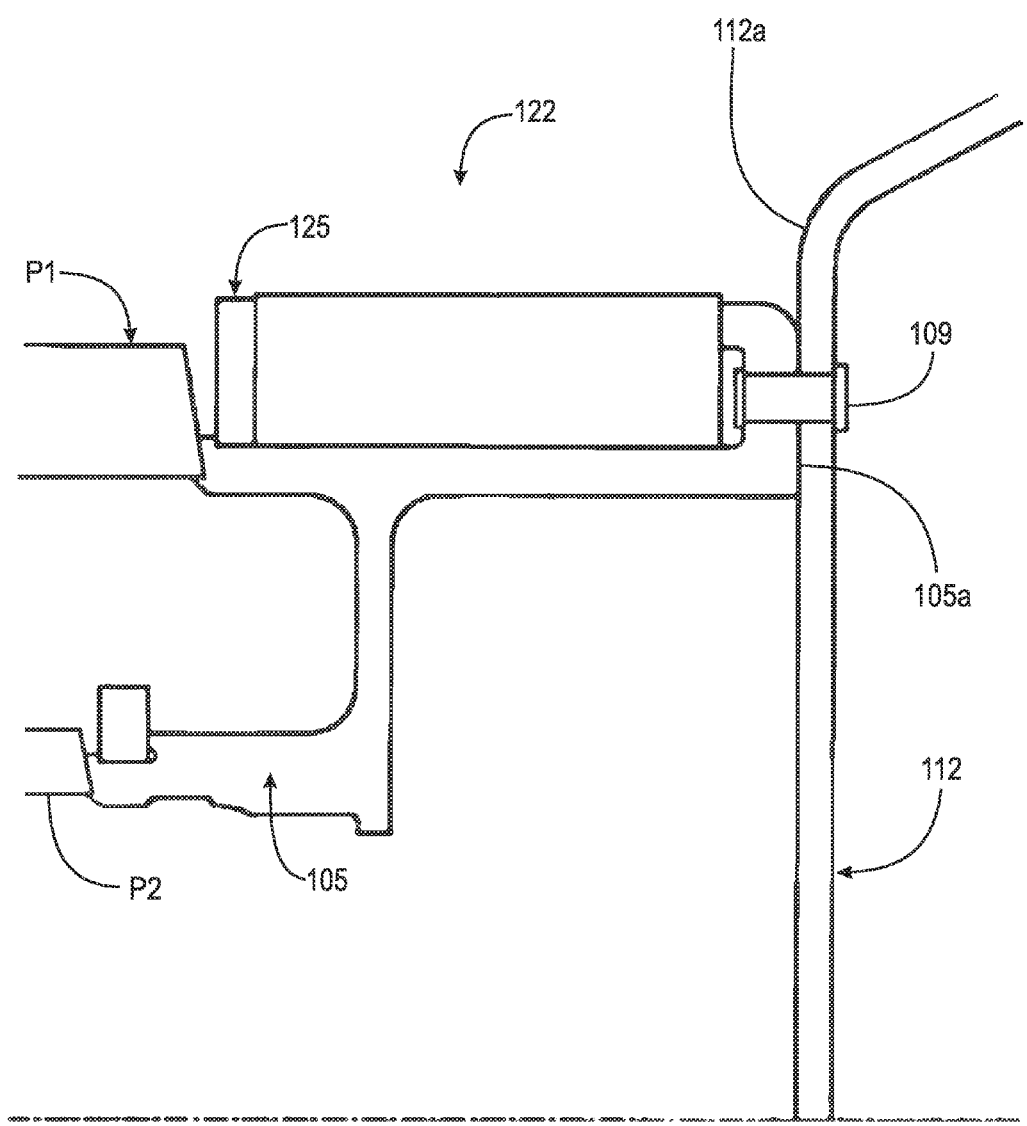

FIGS. 4A and 4B illustrate a method of securing components to a hub of a hybrid drive module including torque converter 110 and disconnect clutch 132. The following should be viewed in light of FIGS. 2, 4A and 4B. Although the method is presented as a sequence of steps for clarity, no order should be inferred from the sequence unless explicitly stated. A first step non-rotatably connects rotor 122 for electric motor 120 to circumferential surface 107 of hub 105, for example, engaging rotor 122 with splines 143. A second step places end plate 124 on surface 107. A third step deforms, using punch P1, material forming hub 105 to form protrusions 106 extending radially outward from surface 136. Note that in an example embodiment, prior to receiving punch P1, end 141 of hub 105 is planar. A fourth step restrains, with protrusions 106, displacement of end plate 125 and rotor 122 with respect to hub 105 in axial direction AD1. A fifth step non-rotatably connects hub 105 to cover 112 for torque converter 110.

In an example embodiment, a sixth step urges, with protrusions 106, plate 125 into contact with rotor 122. In an example embodiment, a seventh step contacts end plate 125 with protrusions 106. An eighth step non-rotatably connects input part 130, arranged to receive torque, and inner carrier 134. A ninth step non-rotatably connects at least one clutch plate 133 to hub 105. A tenth step non-rotatably connects at least one clutch plate 135 to inner carrier 134. An eleventh step installs piston plate 136 axially displaceable to open and close disconnect clutch 132.

In an example embodiment: a twelfth step engages resolver rotor 128 with circumferential surface 138 of hub 105; a thirteenth step deforms, using punch P1 or P2, the material forming hub 105 to form protrusions 139 extending radially outward from circumferential surface 138; and a fourteenth step fixedly secures the resolver rotor to the hub with protrusions 139. Note that in an example embodiment, prior to receiving punch P1 or P2, end 142 of hub 105 is planar.

Figure 5A:
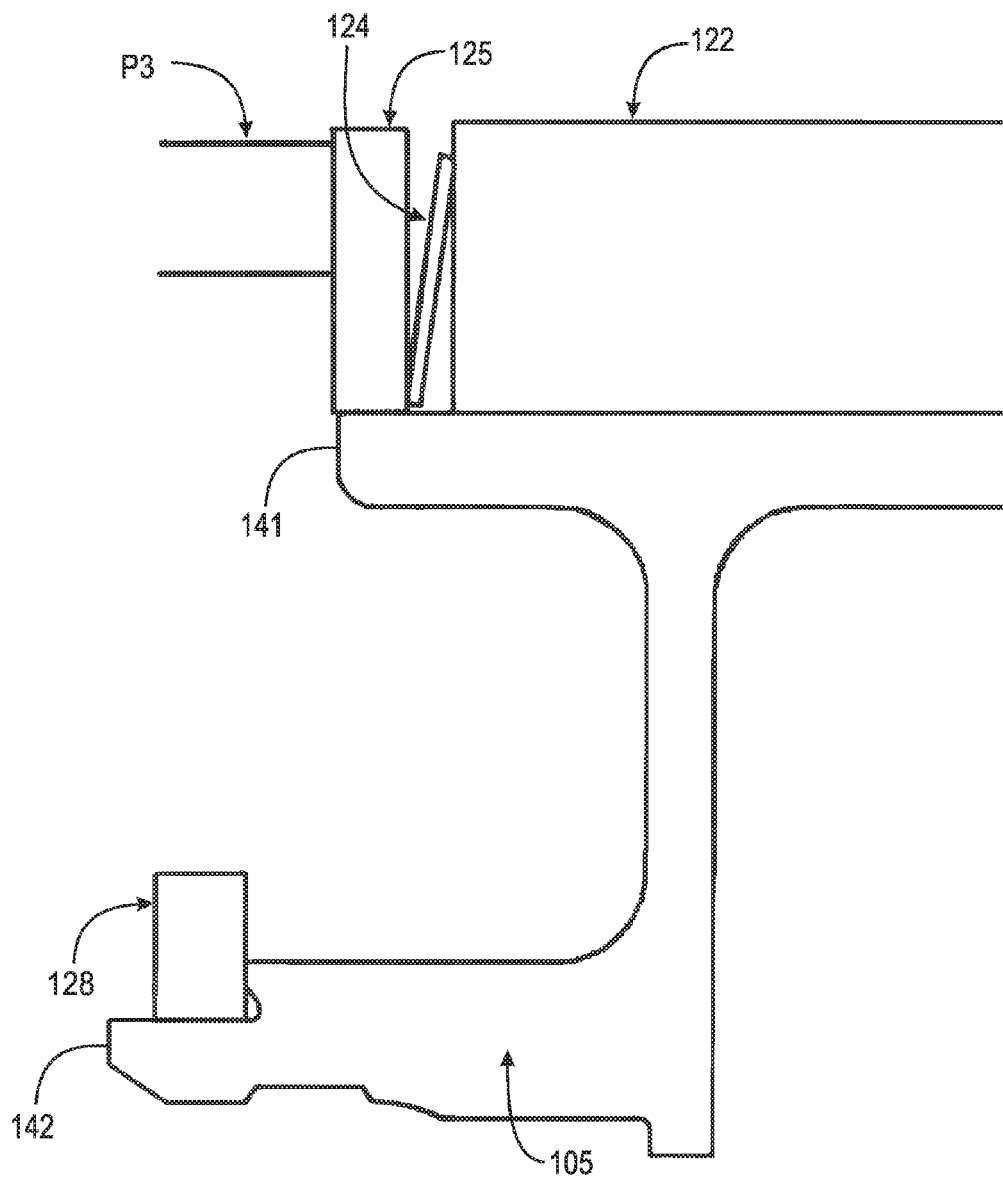
Figure 5B:
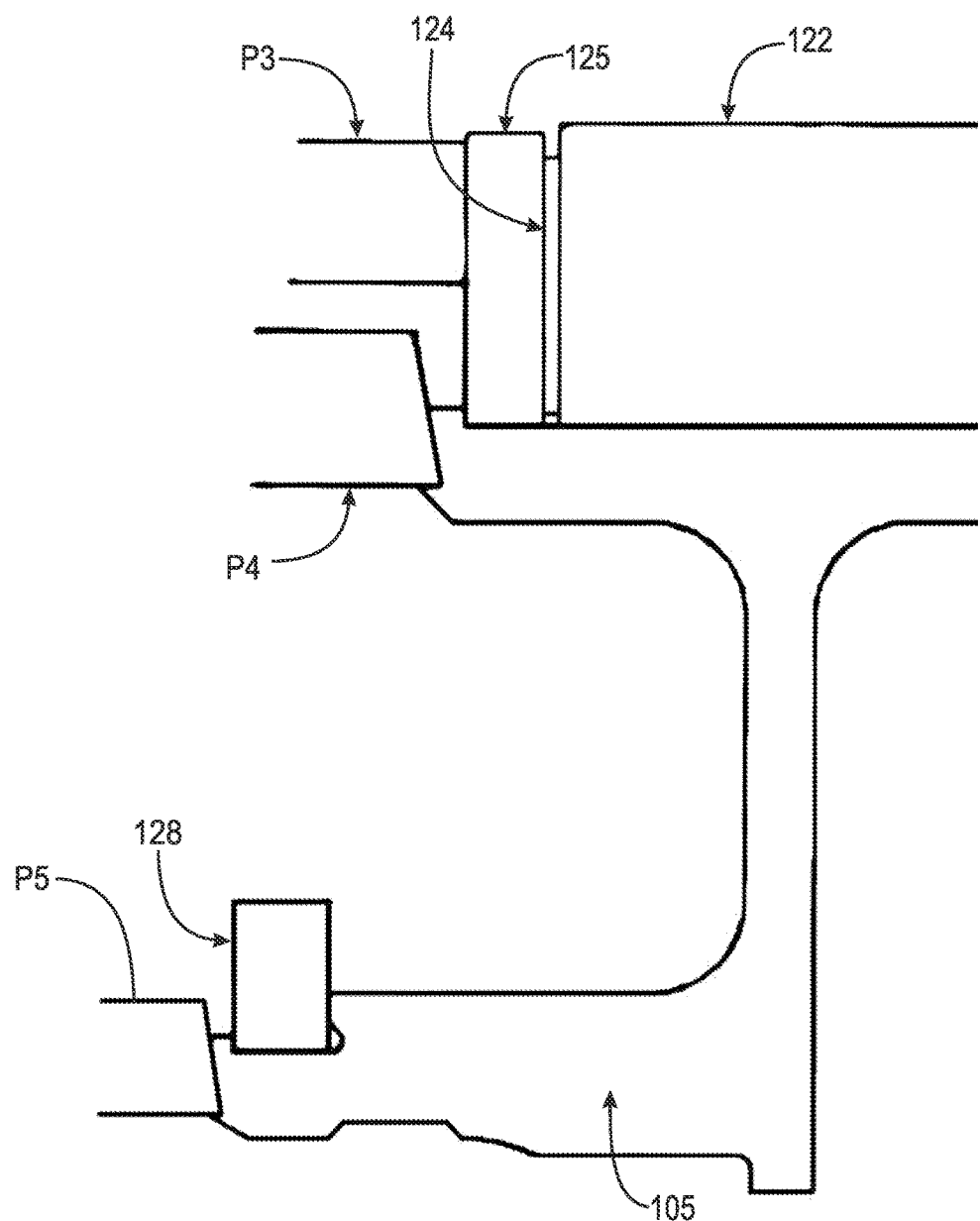

FIGS. 5A and 5B illustrate a method of securing components to a hub of a hybrid drive module including torque converter 110 and disconnect clutch 132. The following should be viewed in light of FIGS. 3, 5A and 5B. Although the method is presented as a sequence of steps for clarity, no order should be inferred from the sequence unless explicitly stated. A first step non-rotatably connects rotor 122 for electric motor 120 to circumferential surface 107 of hub 105, for example, engaging rotor 122 with splines 143. A second step places end plate 124 on surface 107. A third step inserts spring 124 between end plate 125 and the rotor. A fourth step compresses, with punch P3, the spring between end plate 125 and rotor 122. A fifth step urges, with the spring, the rotor in axial direction AD2. A sixth step deforms, using punch P4, material forming hub 105 to form protrusions 106 extending radially outward from surface 136. Note that in an example embodiment, prior to receiving punch P4, end 141 of hub 105 is planar. A seventh step restrains, with protrusions 106, displacement of end plate 125 and rotor 122 with respect to hub 105 in axial direction AD1. An eighth step non-rotatably connects hub 105 to cover 112 of torque converter 110.

In an example embodiment, a ninth step urges, with protrusions 106, plate 125 into contact with spring 124. In an example embodiment, a tenth step contacts end plate 125 with protrusions 106. An eleventh step non-rotatably connects input part 130, arranged to receive torque, and inner carrier 134. A twelfth step non-rotatably connects at least one clutch plate 133 to hub 105. A thirteenth step non-rotatably connects at least one clutch plate 135 to inner carrier 134. A fourteenth step installs piston plate 136 axially displaceable to open and close disconnect clutch 132.

In an example embodiment: a fifteenth step engages resolver rotor 128 with circumferential surface 138 of hub 105; a sixteenth step deforms, using punch P4 or punch P5, the material forming hub 105 to form protrusions 139 extending radially outward from circumferential surface 138; and a seventeenth step fixedly secures the resolver rotor to the hub with protrusions 139. Note that prior to receiving punch P4 or P5, end 142 of hub 105 is planar.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A hybrid drive module, comprising:
   a torque converter including:
      a cover;
      an impeller; and,
      a turbine;
   a rotor for an electric motor, the rotor including a magnet;
   a hub non-rotatably connected to the rotor and the cover and including:
      a first circumferential surface; and,
      a first plurality of protrusions:
         extending radially outward from the first circumferential surface; and,
         formed of a material forming the hub; and,
   an end plate:
      not part of the rotor;
      made of a non-magnetic material;
      disposed between the first plurality of protrusions and the rotor; and, engaged with the rotor, wherein:
the first plurality of protrusions restrains the end plate and the rotor, with respect to the hub, in a first axial direction; and,
the end plate blocks movement of the magnet in the first axial direction.

2. The hybrid drive module of claim 1, wherein the first plurality of protrusions fixes an axial position of the rotor on the hub.

3. The hybrid drive module of claim 1, wherein:
the material forming the hub, with the exception of the first plurality of protrusions and material adjoining the first plurality of protrusions, has a first number of lattice defects including point defects or imperfections, line defects, or surface defects-grain boundaries, per unit of volume; and,
the material forming the first plurality of protrusions has a second number of lattice defects, including point defects or imperfections, line defects, or surface defects-grain boundaries, per unit of volume greater than the first number of lattice defects per unit of volume.

4. The hybrid drive module of claim 1, wherein the first plurality of protrusions is in contact with the end plate and urges the end plate into contact with the rotor in a second axial direction, opposite the first axial direction.

5. The hybrid drive module of claim 1, wherein the hub includes:
a second circumferential surface; and,
a second plurality of protrusions:
extending radially outward from the second circumferential surface; and,
formed of the material forming the hub, the hybrid drive module further comprising:
a resolver rotor engaged with the second circumferential surface, wherein the second plurality of protrusions fixedly secures the resolver rotor to the hub.

6. The hybrid drive module of claim 1, further comprising:
an input part arranged to receive torque; and,
a disconnect clutch including:
at least one first clutch plate non-rotatably connected to the hub;
an inner carrier non-rotatably connected to the input part;
at least one second clutch plate non-rotatably connected to the inner carrier; and,
a piston plate axially displaceable to open and close the disconnect clutch.

7. A hybrid drive module, comprising:
a torque converter including:
a cover;
an impeller; and,
a turbine;
a rotor for an electric motor;
an end plate;
a hub non-rotatably connected to the rotor and the cover and including:
a first circumferential surface; and,
a first plurality of protrusions:
extending radially outward beyond the first circumferential surface;
formed of the material forming the hub; and,
restraining the rotor, with respect to the hub, in a first axial direction; and,
a spring located between the rotor and the first plurality of protrusions for the hub and urging the rotor in a second axial direction, opposite first axial direction.

8. The hybrid drive module of claim 7, wherein:
the first plurality of protrusions are in contact with the end plate; and,
the spring reacts against the end plate to urge the rotor in the second axial direction.

9. The hybrid drive module of claim 7, wherein:
the material forming the hub, with the exception of the first plurality of protrusions and material adjoining the first plurality of protrusions, has a first number of lattice defects, including point defects or imperfections, line defects, or surface defects-grain boundaries, per unit of volume; and,
the material forming the first plurality of protrusions has a second number of lattice defects, including point defects or imperfections, line defects, or surface defects-grain boundaries, per unit of volume greater than the first number of lattice defects per unit of volume.

10. The hybrid drive module of claim 7, wherein:
the rotor includes at least one magnet;
the end plate is made of a non-magnetic material; and,
the end plate restrains the at least one magnet in the first axial direction.

11. The hybrid drive module of claim 7, further comprising:
an input part arranged to receive torque; and,
a disconnect clutch including:
at least one first clutch plate non-rotatably connected to the hub;
an inner carrier non-rotatably connected to the input part;
at least one second clutch plate non-rotatably connected to the inner carrier; and,
a piston plate axially displaceable to open and close the disconnect clutch.

12. The hybrid drive module of claim 11, wherein:
for a first mode:
the disconnect clutch is open to enable independent rotation of the hub and the inner carrier; and,
the rotor is the only source of torque for the torque converter;
for a second mode:
the disconnect clutch is closed to non-rotatably connect the hub and the inner carrier; and,
the input part is the only source of torque for the torque converter; and,
for a third mode:
the disconnect clutch is closed to non-rotatably connect the hub and the inner carrier; and,
the rotor provides torque to the input part via the disconnect clutch.

13. A method of securing components to a hub of a hybrid drive module including a torque converter and a disconnect clutch, comprising:
non-rotatably connecting a rotor for an electric motor to a first circumferential surface of a hub;
placing an end plate on the first circumferential surface;
inserting a spring between the end plate and the rotor;
compressing, using a first punch, the spring between the end plate and the rotor;
urging, with the spring, the rotor in a first axial direction;
deforming, using a second punch, material forming the hub to form a first plurality of protrusions extending radially outward from the first circumferential surface;

contacting the end plate with the first plurality of protrusions; and, restraining, with the first plurality of protrusions, displacement of the end plate and the rotor, with respect to the hub, in a second axial direction, opposite the first axial direction.

14. The method of claim 13, further comprising:

engaging a resolver rotor with a second circumferential surface of the hub;

deforming, using the second punch or a third punch, the material forming the hub to form a second plurality of protrusions extending radially outward from the second circumferential surface; and, fixedly securing the resolver rotor to the hub with the second plurality of protrusions.

15. The method of claim 13, further comprising:

deforming the material forming the hub such that:
  the material forming the hub, with the exception of the first plurality of protrusions and material adjoining the first plurality of protrusions, has a first number of lattice defects including point defects or imperfections, line defects, or surface defects-grain boundaries, per unit of volume; and,
  the material forming the first plurality of protrusions has a second number of lattice defects, including point defects or imperfections, line defects, or surface defects-grain boundaries, per unit of volume greater than the first number of lattice defects per unit of volume.

16. The method of claim 13, further comprising:

non-rotatably connecting the hub and a cover for the torque converter.

* * * * *